G. P. PRICE.
Plow Sulky and Cultivator.
No. 210,147.  Patented Nov. 19, 1878.
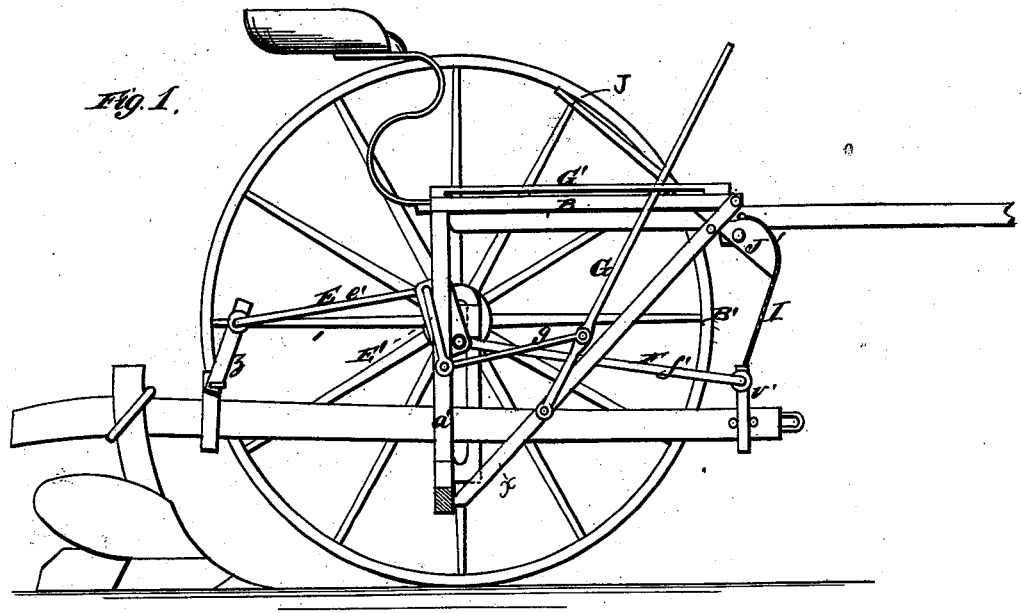
Fig. 1.
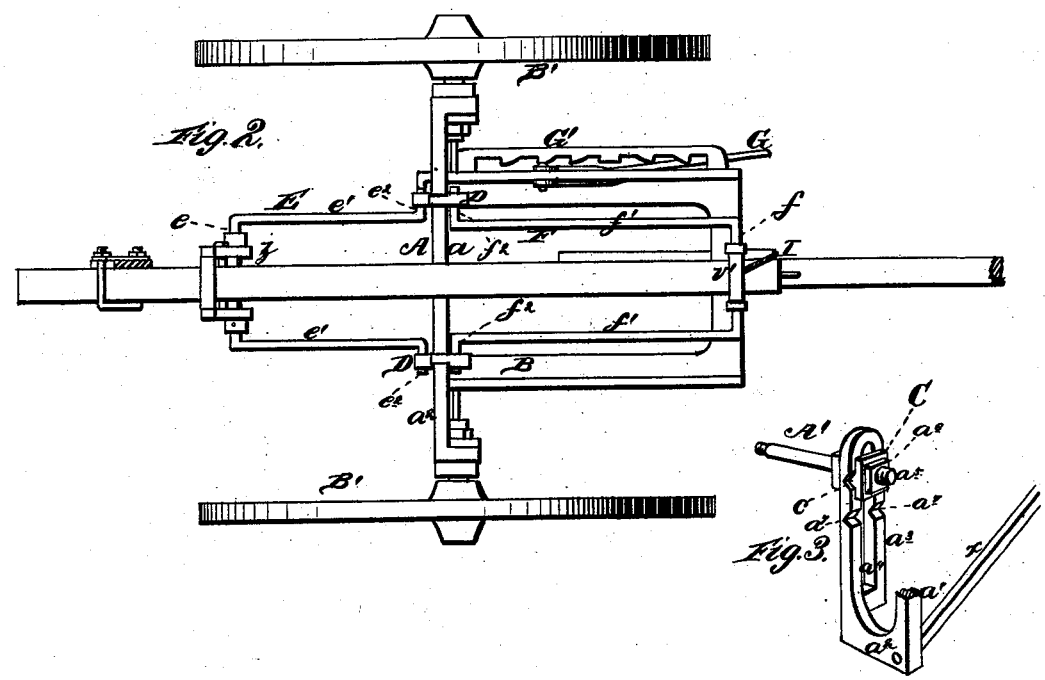
Fig. 2.
Fig. 3.
WITNESSES
Robert Everett
James J. Sheehy
INVENTOR.
George P. Price.
By Gilmore, Smith & Co.
ATTORNEYS.
N. PETERS, PHOTO-LITHOGRAPHER, WASHINGTON, D. C.

UNITED STATES PATENT OFFICE.

GEORGE P. PRICE, OF CARLISLE STATION, OHIO.

IMPROVEMENT IN PLOW-SULKY AND CULTIVATOR.

Specification forming part of Letters Patent No. 210,147, dated November 19, 1878; application filed October 12, 1878.

*To all whom it may concern:*

Be it known that I, GEORGE P. PRICE, of Carlisle Station, in the county of Warren and State of Ohio, have invented a new and valuable Improvement in Plow-Sulky and Cultivator combined; and I do hereby declare that the following is a full, clear, and exact description of the construction and operation of the same, reference being had to the annexed drawings, making a part of this specification, and to the letters and figures of reference marked thereon.

Figure 1 of the drawings is a side view, part sectional, of my plow. Fig. 2 is a plan view of the same, and Fig. 3 is a perspective detail view.

This invention has relation to plow-sulkies, &c.; and it consists in the improvements in the construction of the same hereinafter fully described, and particularly pointed out in the claim.

To an axle having four vertical and three longitudinal portions is secured two plates, one on each of the central vertical portions, to which plates are journaled arms, which will now be described.

As adapted to a plow-beam, the forward end of the beam is adjustably secured by a suitable pendant to a transverse section of the forward arm, from which section, extending rearward, are two longitudinal sections, which terminate in two outwardly-projecting transverse arms, which are journaled in the plates as a pivot. From the forward transverse section a rope or chain extends upward, and is attached to a foot-lever, by means of which the tip of the plow-beam may be raised or lowered by the driver at will. From these same bearing-plates an arm extends rearward, which is secured to the plow-beam by a pivotal framing, and to a downwardly-extending portion of this arm is pivoted a link, which link is in turn pivoted loosely to a lever secured at one end to the axle-brace, and provided with a rack-bar. By means of this lever the rear end of the plow is raised or lowered by hand. Each of these arms may be readily detached by springing in the ends until they are disconnected from the plates, and others may be as readily attached. The outer upright portions of the axle are provided with slots and lateral grooves upon their inner surface. In these slots operate short axles, on which are hung the sulky-wheels, which axles are provided with screw-threads, to receive a binding-nut, between which and the nuts are washers, with ridges which operate in the grooves in the inner surface of the axle. By this construction, if uneven from one wheel running in the furrow, or from any other cause, the other wheel may be adjusted in the slot, so as to keep the body of the sulky and the implement level.

The plow may be detached and a cultivator substituted. The cultivator has a rear arm similar to the one used on the plow, and it is attached at its forward end to the tongue of the sulky. When used as a plow, the draft is from the end of the plow-beam, the sulky simply acting as a carriage. When used as a cultivator, the draft is from the sulky.

Referring to the drawings, A represents the axle, composed of a transverse portion, $a$, upon which rests the body B and two downwardly-projecting portions, $a^1 a^1$, two cross-sections, $a^2 a^2$, from which braces $x\ x$ run to the forward end of the body, and two vertical portions, $a^3 a^3$, each provided with slot $a^4$, in which operates axle A′, having screw-thread $a^5$, which receives a nut, $a^6$. Upon the axle A′ is hung the sulky-wheel B′, which is vertically adjustable by means of the set-nut $a^6$ and the washer C, having ridges $c$, which ridges operate in the grooves $a^7$ of the slotted sections $a^3$. Secured to the sections $a^1$ are plates D D, which furnish pivotal bearings for arms E and F. The arm E is composed of a transverse portion, $e$, two longitudinal portions, $e^1 e^1$, and two outwardly-extending short arms, $e^2 e^2$, which are journaled in the plates D. From the short arm $e^2$, and rigid therewith, is an arm, E′, to which is pivoted a link, $g$, which, in turn, is pivoted to a hand-lever, G, which operates in a rack-bar, G′, on the body B. From the portion $e$ is hung a laterally-adjustable pivoted framing, $z$, which connects it loosely with the rear portion of the plow-beam. The arm F is composed of a similar transverse portion, $f$, (to which is adjustably secured a framing, $v'$, which is secured to the tip of the plow-beam,) and two longitudinal portions, $f^1 f^1$, and two short arms, $f^2 f^2$, which have pivotal bearings in the plates D. From the transverse portion $f$ a rope or chain, I, extends upward, and is attached to a foot-lever, J, having a cam, $j'$.

What I claim as new, and desire to secure by Letters Patent, is—

In a plow-sulky, the combination of the frame F, composed of the arms $f^1 f^1$ and short arms $f^2 f^2$, provided with the removable frame $v'$, the short arms $f^2 f^2$ being adapted to be sprung into and removed from holes in the frames D D, in combination therewith, and with the frame E, composed of the arms E′, $e$, $e^1$, $e^2$, and $z$, removably connected to a clamping-frame upon the plow-beam near its rear end, and adapted to be operated by suitable levers, as G J, for the purpose of permitting the plow-beam to be removed and replaced by cultivators, as set forth.

In testimony that I claim the above I have hereunto subscribed my name in the presence of two witnesses.

GEORGE P. PRICE.

Witnesses:
  A. F. SPOHR,
  C. H. BUTLER.